(12) United States Patent
Werker et al.

(10) Patent No.: US 11,329,545 B2
(45) Date of Patent: May 10, 2022

(54) CHOKE ARRANGEMENT AND RECEPTACLE FOR THE CHOKE ARRANGEMENT

(71) Applicant: Hanon Systems, Daejeon (KR)

(72) Inventors: Stephan Werker, Merzenich-Golzheim (DE); Stefan Tydecks, Cologne (DE)

(73) Assignee: Hanon Systems, Daejeon (KR)

( * ) Notice: Subject to any disclaimer, the term of this patent is extended or adjusted under 35 U.S.C. 154(b) by 626 days.

(21) Appl. No.: 16/274,813

(22) Filed: Feb. 13, 2019

(65) Prior Publication Data

US 2019/0267890 A1  Aug. 29, 2019

(30) Foreign Application Priority Data

Feb. 28, 2018 (DE) ...................... 10 2018 104 597.2
Jun. 26, 2018 (DE) ...................... 10 2018 115 283.3

(51) Int. Cl.
| | |
|---|---|
| *H01F 27/02* | (2006.01) |
| *H01F 17/06* | (2006.01) |
| *H02M 1/12* | (2006.01) |
| *H01F 27/06* | (2006.01) |
| *H01F 27/28* | (2006.01) |
| *H01F 27/32* | (2006.01) |
| *H01F 5/04* | (2006.01) |

(52) U.S. Cl.
CPC ............ *H02M 1/126* (2013.01); *H01F 17/06* (2013.01); *H01F 17/062* (2013.01); *H01F 27/02* (2013.01); *H01F 27/027* (2013.01); *H01F 27/06* (2013.01); *H01F 27/2828* (2013.01); *H01F 27/324* (2013.01); *H01F 27/2895* (2013.01); *H01F 2005/046* (2013.01)

(58) Field of Classification Search
CPC ........ H02M 1/126; H02M 1/44; H02M 7/003; H01F 27/027; H01F 27/324; H01F 17/062; H01F 27/06; H01F 27/2828; H01F 27/2895; H01F 2005/046; H01F 27/02; H01F 17/06; H01F 3/14; H01F 17/0033; H01F 2017/065; H01F 2017/0093
See application file for complete search history.

(56) References Cited

U.S. PATENT DOCUMENTS

| | | | | |
|---|---|---|---|---|
| 5,581,224 | A * | 12/1996 | Yamaguchi | ............... H01F 3/10 333/185 |
| 6,456,182 | B1 * | 9/2002 | Katayama | ............. H01F 17/062 336/170 |
| 2016/0293312 | A1 | 10/2016 | Kanai et al. | |

(Continued)

FOREIGN PATENT DOCUMENTS

| | | |
|---|---|---|
| CN | 201498305 U | 6/2010 |
| DE | 102005027942 A1 | 12/2006 |
| DE | 102007060556 A1 | 6/2009 |

(Continued)

*Primary Examiner* — Tuyen T Nguyen
(74) *Attorney, Agent, or Firm* — Norton Rose Fulbright US LLP; James R. Crawford

(57) ABSTRACT

The invention, which relates to a choke arrangement (1) for application in an EMC filter, has as its objective specifying a choke arrangement (1) that is mechanically robust and that enables improved insulation of the windings (4, 5). The objective is attained by disposing about the toroidal core (10) a two-part enclosure (15) and by disposing an insulation web (19) in the two-part enclosure (15).

8 Claims, 8 Drawing Sheets

(56) References Cited

U.S. PATENT DOCUMENTS

Figure 1:
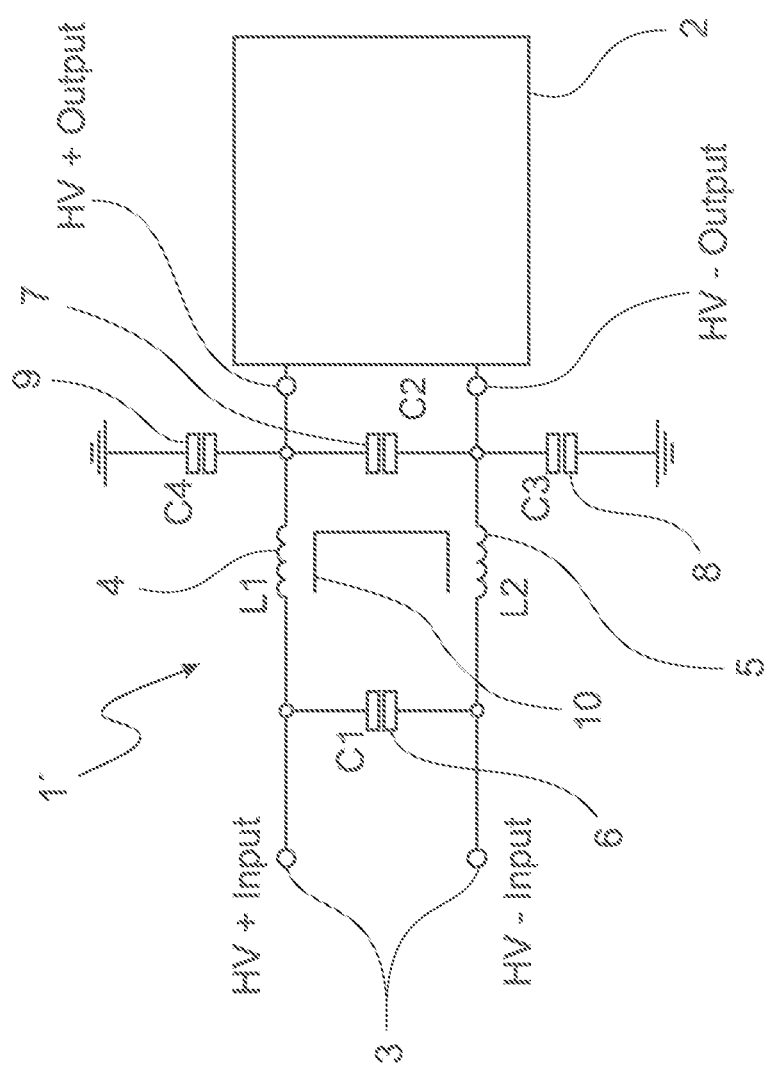

2016/0336846 A1    11/2016  Walczak et al.

FOREIGN PATENT DOCUMENTS

| DE | 102013213404 A1 | 1/2015 |
| DE | 102016209613 A1 | 12/2017 |
| JP | S572710 U | 1/1982 |
| JP | S5970324 U | 5/1984 |
| JP | 2002203723 A | 7/2002 |
| JP | 2003272924 A | 9/2003 |
| JP | 2016115883 A | 6/2016 |
| JP | 2017228606 A | 12/2017 |

* cited by examiner

Stand der Technik

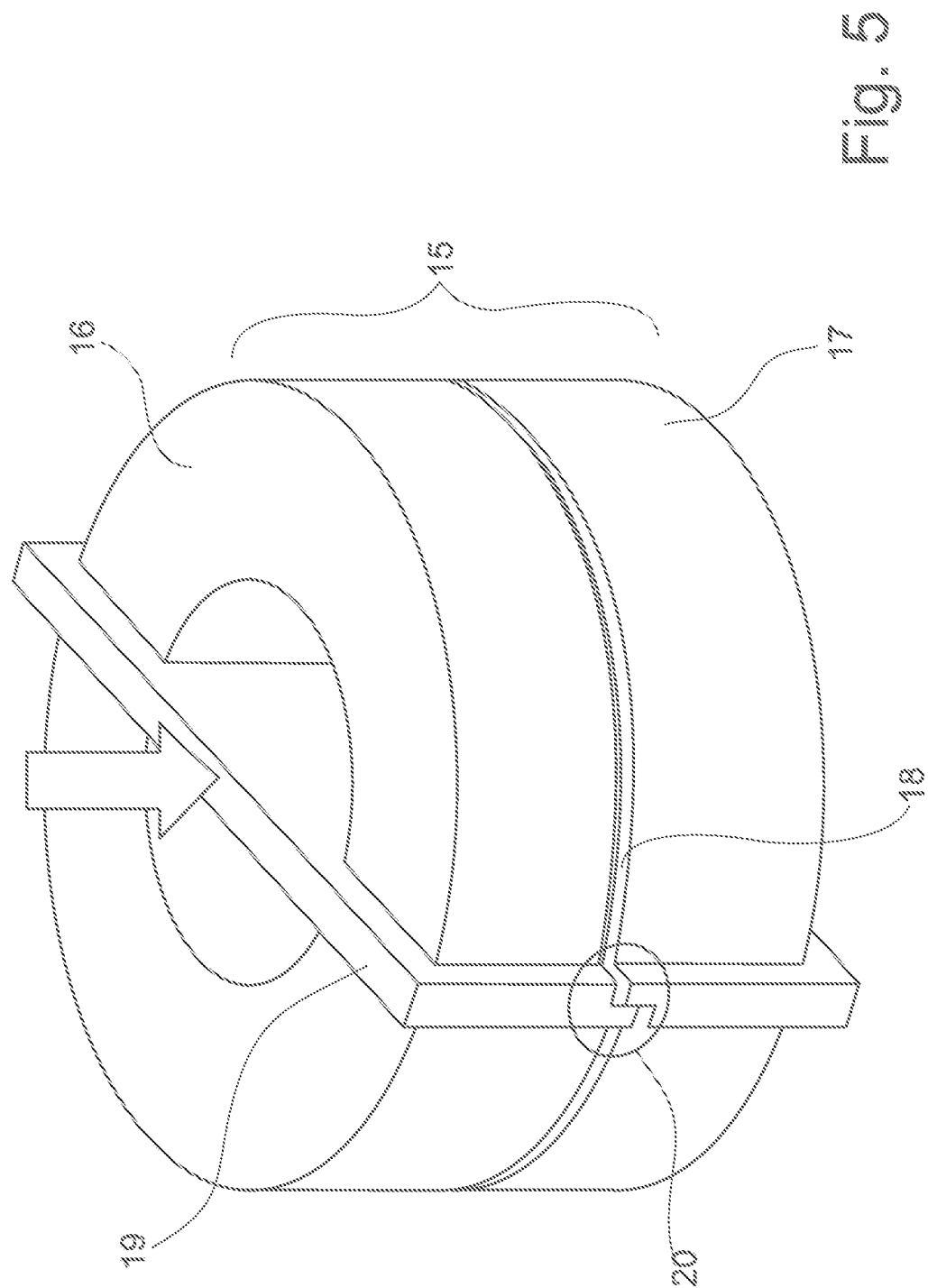

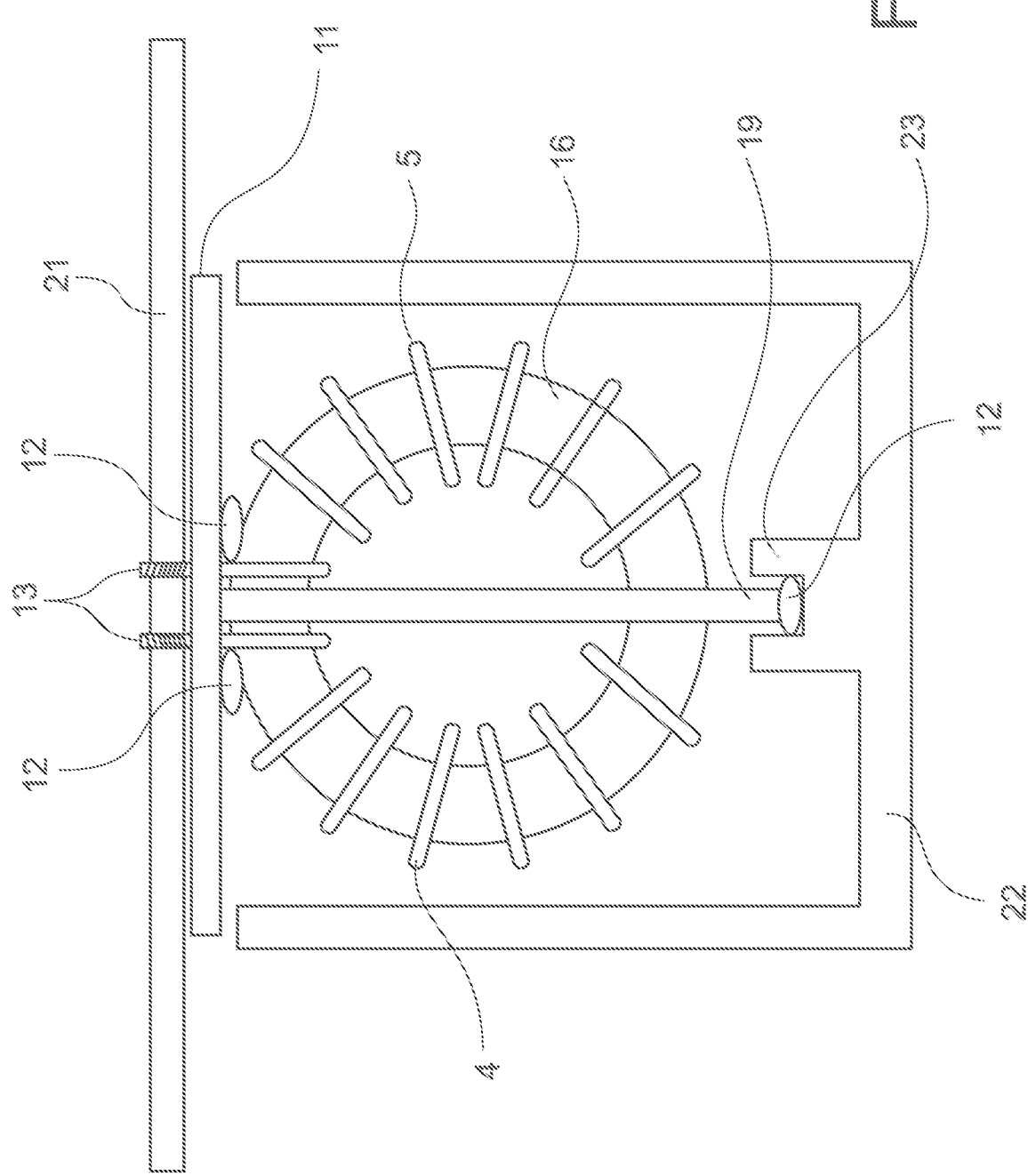

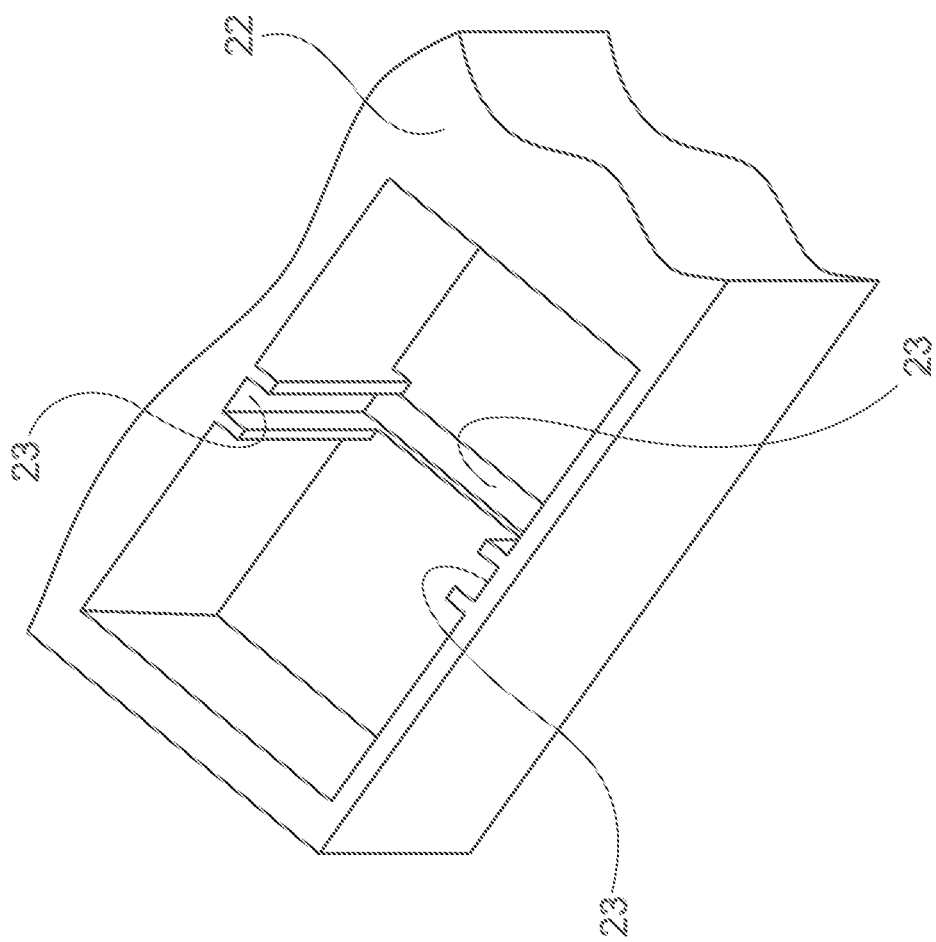

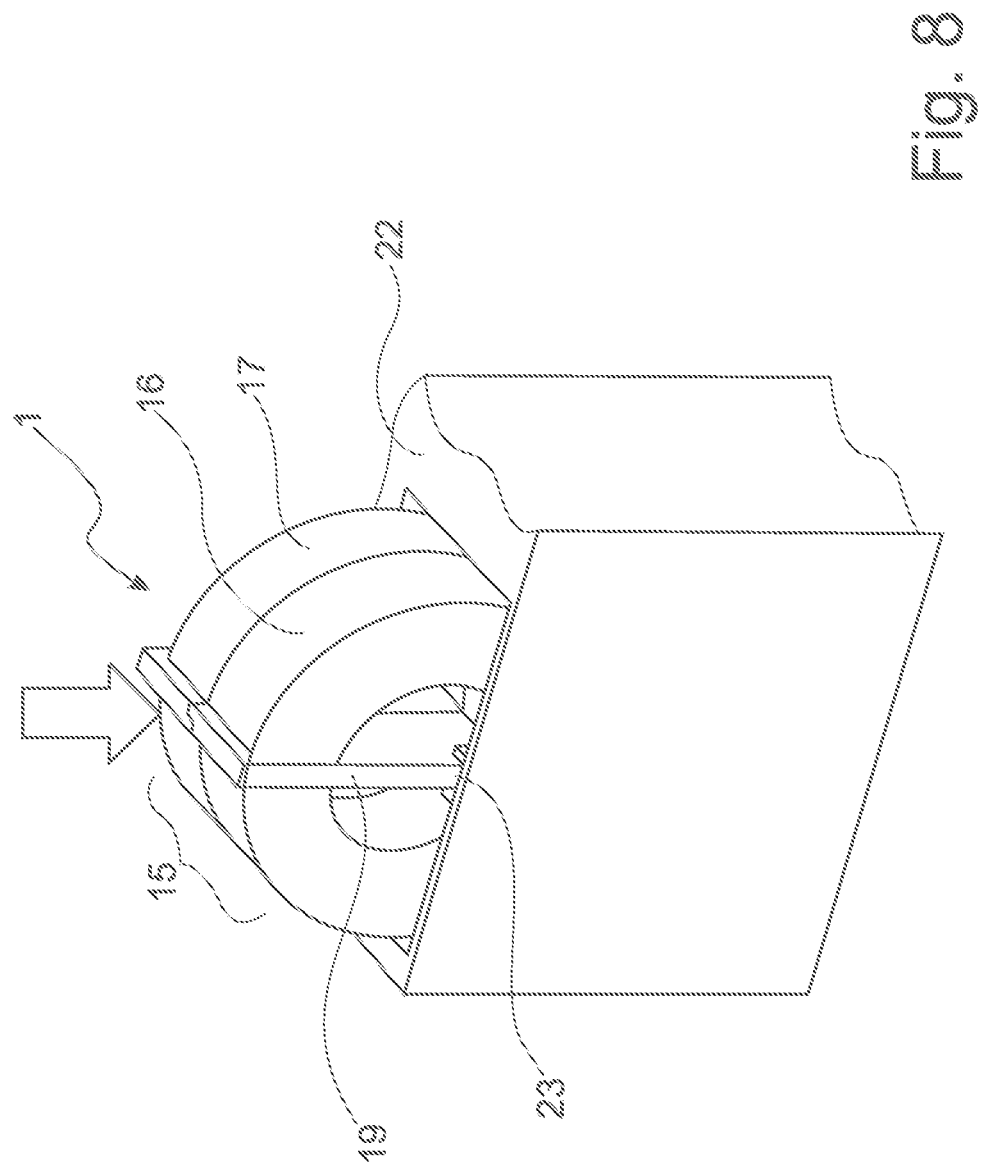

CHOKE ARRANGEMENT AND RECEPTACLE FOR THE CHOKE ARRANGEMENT

This application claims priority from German Patent Application No. 10 2018 104 597.2, filed Feb. 28, 2018, and German Patent Application No. 10 2018 115 283.3, filed Jun. 26, The entire contents of these applications are incorporated herein by reference in their entirety.

The invention relates to a choke arrangement for application in an EMC filter, comprising a toroidal core and at least two windings disposed on the toroidal core under electrical isolation.

The invention also relates to a receptacle for the choke arrangement for its mechanical fixing on a control board of an inverter for an electrical refrigerant compressor.

In electronic componentry, in which switching processes are carried out with electric voltages or currents, interferences are generated as a consequence of these switching processes due to the generated electrical pulses with the associated emission of interference signals. These interferences can propagate as electromagnetic waves conductively across lines as well as also radiatively through free space.

The capability of a technical device not to subject other devices to unintentional or accidental electric or electromagnetic effects, or be subjected to same by other devices, is referred to as electromagnetic compatibility (EMC).

To avoid or minimize the propagation of such interferences, prior art proposes equipping this componentry with a filter unit, a so-called EMV-filter, EMC filter or network filter. It is also known to take measures for shielding or screening the electronic componentry in order to avoid impacting the correct functions of other electronic components or devices through interference signals of too high an amplitude level.

The magnitudes of such interference signals that a device currently in circulation must observe are established in EMC standardizations associated with this device and are described by means of limit values and minimum requirements that must be satisfied.

Known in this context are for example so-called ECE provisions which include a catalog of international agreements on uniform technical regulations for motor vehicles as well as for parts and equipment objects of motor vehicles. The area of radio interference suppression is treated, for example, in ECE R10, which has to be followed for future developments and which will result in further decrease of the permissible interference radiation.

Electromagnetic interference radiation is also generated when operating electric inverters that actuate an electric motor and thus switch currents of high amplitude. Such an inverter is utilized, for example, in actuating a motor in an air conditioner compressor of a motor vehicle.

A known solution for suppressing the interference radiation on electric or electronic componentry is the use of a passive EMC filter. Such passive EMC filters are conventionally realized with the aid of passive components such as capacitors, coils and resistors that are wired with one another in known, suitable manner and in this way generate the desired filter effect.

Based on the type of interferences to be filtered by means of an EMC filter, the distinction is made between common mode interferences and differential mode interferences. In practice the interference spectrum to be filtered by the EMC filter is comprised of the sum of both superposed interference components.

The type, structure and especially the voltage level of an inverter, for example for an electric refrigerant compressor, determine which of the two interference components is predominant and, consequently, which of the two interference components must be filtered more strongly.

In the case of inverters for refrigerant compressors that are operated, for example, in a voltage range of approximately 48 V, due to the low operating voltage and the simultaneously high currents in a range of for example 100 A to 200 A, differential mode interferences occur primarily.

In high-voltage inverters operating with voltages between, for example, 400 V and 1000 V, common mode interferences occur primarily.

The application field of the present invention is not limited to the avoidance or minimization of common mode interferences only or differential mode interferences only.

An exemplary implementation described in the following as applying to only one type of these interferences is not to be considered a restriction since the person of skill in the art is capable at any time to adapt the implementation to the other type of interferences through appropriate expert modifications.

Prior art discloses filtering such interferences using so-called chokes that comprise a winding on a core in combination with capacitors in a passive EMC-filter. For this purpose, for example, in each feed line of the inverter HV+ and HV− one winding $L_1$ and $L_2$ is inserted and corresponding capacitors $C_1$ and $C_2$ are disposed between the feed lines HV+ and HV− before and after the windings $L_1$ and $L_2$. In passive EMC filters a third capacitor $C_3$ is additionally disposed on the output side after the winding $L_2$ between line HV− and ground potential and a fourth output-side capacitor $C_4$ is disposed after winding $L_1$ between line HV+ and ground potential.

For limiting currents in electric lines for the intermediate storage of energy in the form of a magnetic field, for impedance matching or for filtering, the use of chokes is known in the form of coils or inductances. Such chokes are frequently integrated into a voltage feed line of an electric component. To raise the so-called inductive impedance, also termed inductance or [inductive] reactance, chokes frequently include a soft magnetic core onto which a winding is applied. It is known in this context to employ ferromagnetic materials as the soft magnetic material, which can be readily magnetized in a magnetic field.

So-called toroidal core chokes are additionally known that can be wound onto a toroidal ferrite core or a powder toroidal core. Such toroidal cores can also be comprised of crystalline or amorphous metal strips. Toroidal cores form a closed magnetic circuit and therefore have only low stray magnetic fields. Such low dispersion contributes to better electromagnetic compatibility.

Through the windings $L_1$ and $L_2$ located in the feed lines HV+ and HV− of the inverter flows a maximally possible input current of the inverter and they must therefore be dimensioned appropriately for the current load occurring therein.

The input current with its superimposed interference generates a magnetic field in the windings $L_1$ and $L_2$ located in feed lines HV+ and HV− of the inverter. Due to the opposite winding directions of the two windings wound onto a common core, the magnetic fields of the input current in the common core cancel each other out in the event common mode chokes (CMC) are used.

Such common mode chokes are, for example, implemented of a toroidal core onto which two windings are applied in opposite directions of windings. Each winding comprises a number of n turns of an electrically conductive wire with n being one or greater.

Such toroidal cores are, for example, comprised of a ferrite material or of a nanocrystalline material.

As described in the following, toroidal cores can be built up of a nanocrystalline material. The nanocrystalline material, available for example in the form of a strip-shaped source material, is wound up into a wrapping. Since nanocrystalline materials have very brittle properties, the nanocrystalline wrapping is encased in a pot-shaped housing with a cover. The structural unit generated in this manner and comprised of the toroidal core and the housing, is sufficiently well protected against mechanical effects.

To fabricate a choke, for example for the winding with a correspondingly dimensioned wire for two windings such a structural unit is clamped into a retainer and the windings, according to prior art, are applied semiautomatically.

Especially with relatively large wire diameters which must be provided for the correspondingly large power loads, in this process strong tensile and compressive stresses act onto the core since the wire to be used for the winding has, on the one hand, a certain mechanical rigidity and, on the other hand, must be wound tightly about the toroidal core with the housing.

Part of prior art, furthermore, includes that in the interior diameter of the toroidal core an insulation plate of a non-ferromagnetic and poorly conducting material, such as epoxide resin or a synthetic material, is placed in order to insulate the two windings from one another. This measure is especially necessary in those cases in which between the windings a potential difference of several 100 V obtains. Without the placement of such insulation plate the air and creepage or leakage distances would fall short of those demanded by provision VDE110—"Isolationskoordination für elektrische Betriebsmittel in Niederspannungsanlagen" (insulation coordination for electrical operating equipment in low voltage systems). It is furthermore customary to adhere the insulation plate in the toroidal core. This is frequently only carried out after the winding process proper has been completed.

U.S. 2016/0336846 A discloses an inductive element mounted on a printed circuit board and comprising a substantially flat carrier and a choke, with the choke being mounted on an upper side of the carrier and comprising a core and at least two inductive coils wound about the core. The wires of the at least two coils are implemented with end segments that are guided through the carrier and terminate on an upper side opposite the lower side of the carrier. The carrier comprises passages for guiding the end segments through the carrier and closures for securing the end segments of the wires in the cavities. By means of the stated solution a compact unit of a carrier and a choke is provided which, in the manner customary in prior art, can be disposed on an inverter board.

However, in using a prior art nanocrystalline toroidal core, the structural unit, comprised of toroidal core and housing, must absorb the mechanical forces. To protect the housing, it may therefore be necessary to limit the magnitude of the wire diameter when applying it in windings.

Moreover, for example with operating voltages in the range of approximately 1000 V, a simple insulation plate is no longer adequate to observe the demanded air and creepage or leakage distances. According to prior art, there is no insulation plate implemented especially in the proximities of the toroidal core which, under unfavorable circumstances, can lead to a voltage flashover.

In addition, the structural unit of toroidal core and housing must be fixed on an electronic circuit board. Adhesion is frequently used for this purpose. To some extent further auxiliary means, such as a plate supporting the structural unit, are also necessary. The large quantity of adhesive agent required for the process increases the production costs.

Moreover, the adhesive must be cured which increases the time expenditures for the fabrication.

For those reasons there is a need for an improved choke arrangement for use in an EMC filter that overcomes the disadvantages of prior art.

The objective of the invention comprises specifying a choke arrangement that is mechanically robust and enables improved insulation of the windings from one another. In addition, a safely and securely insulated and vibration-protected supporting system will be provided for the choke arrangement on a control board or a driver board of an inverter for an electric refrigerant compressor.

The objective is attained through the subject matter with the characteristics according to patent claim 1 as independent patent claim. Further developments are disclosed in the dependent patent claims.

It is herein intended to dispose a toroidal core built, for example, of a strip-shaped nanocrystalline material, in a two-part enclosure. The two-part enclosure is implemented such that the toroidal core can be emplaced in a first part of the two-part enclosure.

By means of the second part of the two-part enclosure, which is applied or placed onto the first part, closure of the enclosure is completed. With the two-part enclosure the complete encompassing or enveloping of a toroidal core is possible.

The two-part enclosure is equipped for this purpose with a suitable annular hollow volume for receiving a toroidal ring core, which hollow volume, due to the division of the enclosure into two parts, is implemented at identical or different proportions. The hollow volume implemented by assembling the two parts of the two-part enclosure is realized such that the toroidal core is received under form closure. Through the secure and tight envelopment of the toroidal core the stable and secure inclusion of the toroidal core is achieved.

The two-part enclosure comprises an insulation web forming an insulation plate. Furthermore, the insulation web is realized in a region known in prior art in the interior diameter of the toroidal core and advantageously around the toroidal core up into a region which is located outside of the outer diameter of the toroidal core. The insulation web forming the insulation plate is consequently preferably realized in the form of a secant which leads through the center of the circle. In this manner the two-part enclosure is realized with an annular hollow volume suitable for inclusion of a toroidal ring core as well as also with an insulation web forming the insulation plate.

The two-part enclosure is advantageously produced of a material such as a synthetic material. Such synthetic materials have good mechanical properties for the robust inclusion of the toroidal core. Synthetic materials are also good electrical insulators. The windings of the choke arrangement can consequently be applied directly onto the two-part enclosure comprised of a synthetic material. Synthetic materials such as polyamides, abbreviated PA, can be processed simply according to a production method known in prior art using, for example, an injection molding method.

The two parts of the two-part enclosure are preferably to be produced of equal form. The two-part enclosure consequently comprises two half shells which, after assembly, form the two-part enclosure. Implementing the enclosure as two half shells of equal form enables using only one mold or one injection mold for the production of the half shells, which results in reduced efforts in the production and reduced costs.

The coupling joints, that is those regions in which the two half shells are in contact after the assembly of the arrangement, are preferably contacting evenly. To secure the half shells of the two-part enclosure in position, adhesive can be applied at the coupling joints and the two half shells can be adhered with one another.

According to an alternative embodiment of the invention the coupling joints are realized at least in one region in steps. The step formation can be implemented along the insulation web for example. By means of one or several steps, joining the half shells to form a structural unit is simplified since the stepping ensures the precise alignment of the half shells with respect to one another. In this case inserting adhesive at the coupling joints to adhere the half shells with one another is also provided.

By inserting stepping at the coupling joints a more mechanically robust structure is obtained and the insulation between winding and toroidal core material at the coupling joints is improved.

Figure 2:
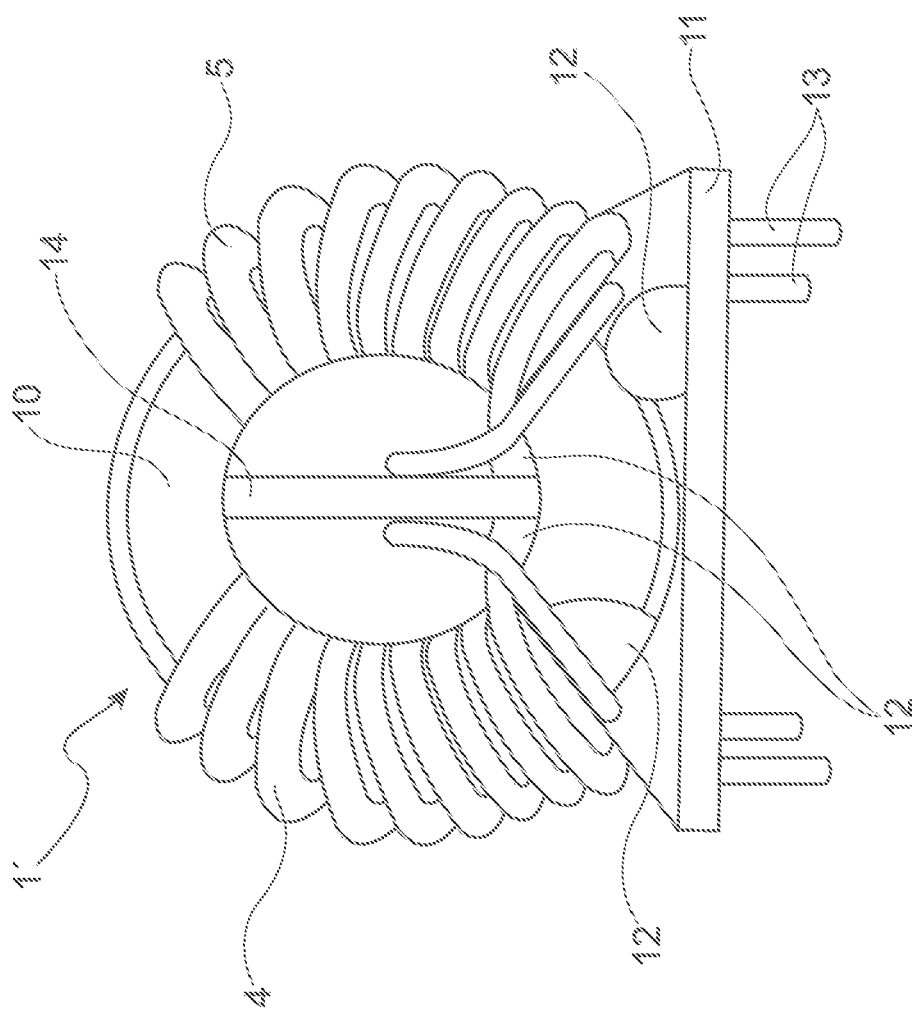
Figure 3:
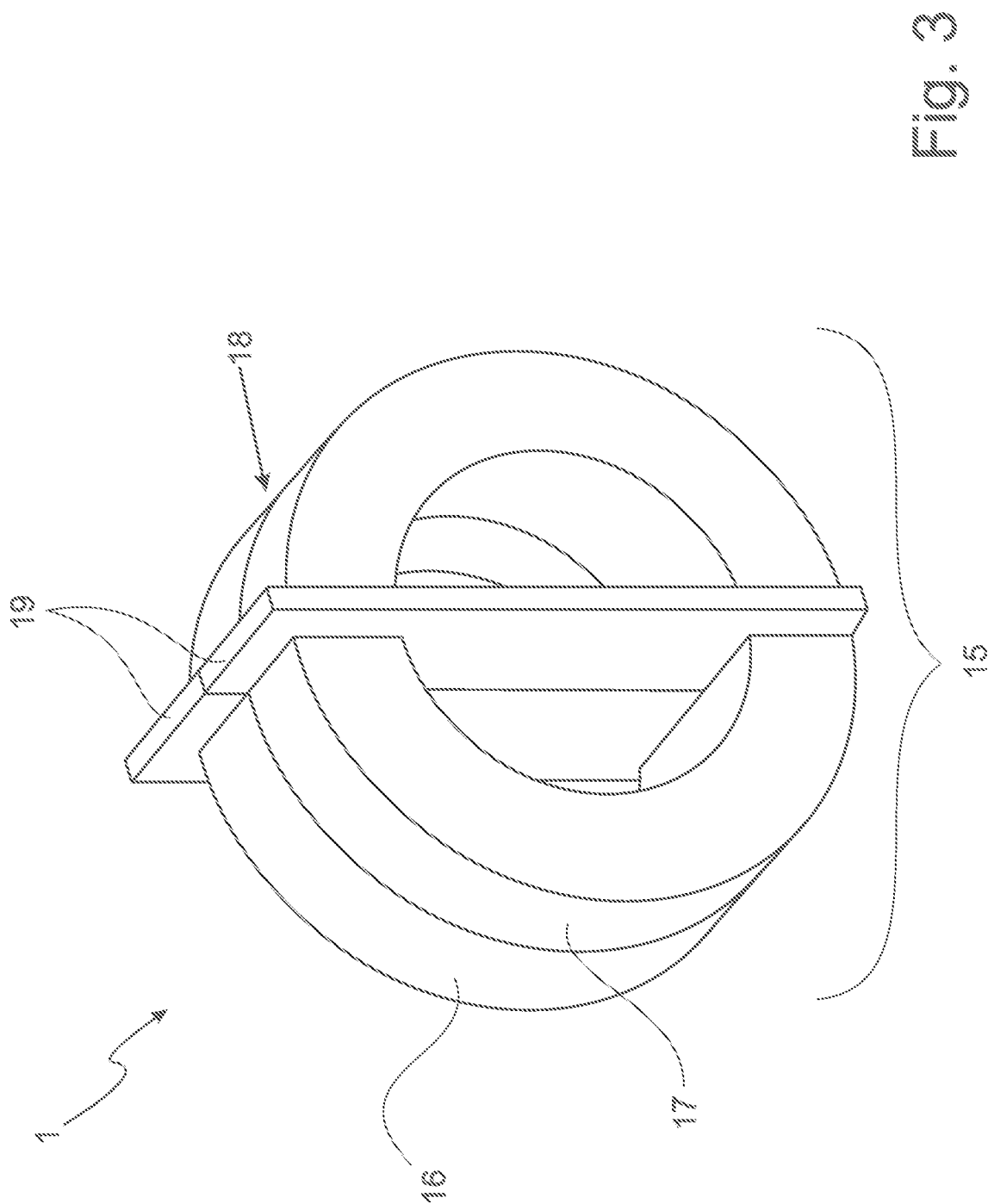
Figure 4:
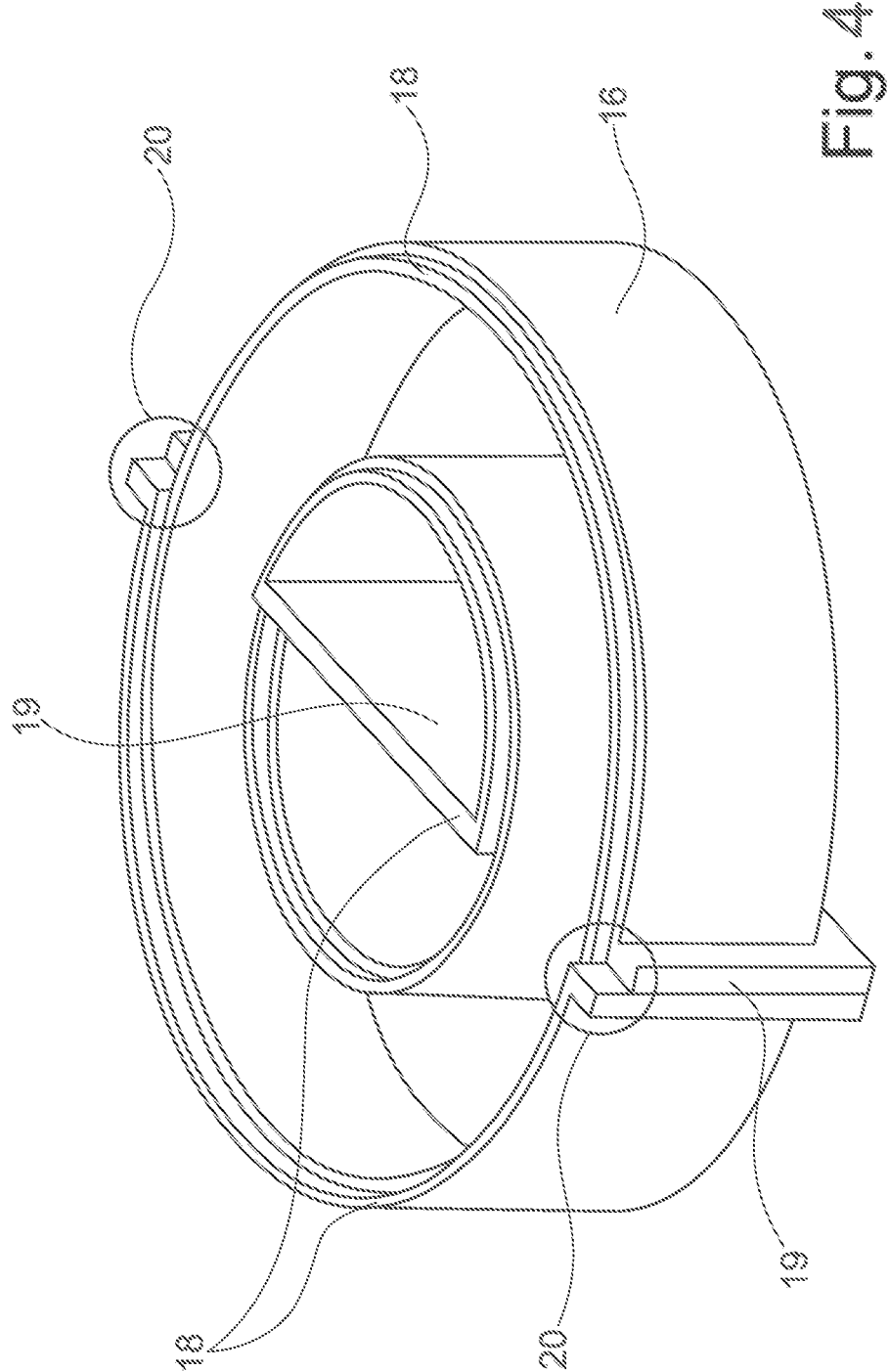

Further details, characteristics and advantages of embodiments of the invention are evident based on the following description of embodiment examples with reference to the associated drawing. Therein depict:

FIG. 1: an exemplary circuit configuration of a passive EMC filter according to prior art by example of an EMC filter circuit with a choke arrangement, in particular a common mode choke, FIG. 2: a prior art common mode choke comprising a toroidal core with two windings applied in opposite winding directions, FIG. 3: a two-part enclosure according to the invention receiving or encompassing a toroidal core, FIG. 4: a half shell of the two-part enclosure according to the invention, FIG. 5: two half shells implemented of equal structure after assembly to form the enclosure with a stepped coupling joint, FIG. 6: schematic diagram of the placement of a choke arrangement with a control board of an inverter for activating an electric refrigerant compressor, FIG. 7: a receptacle suitable for the placement of the choke arrangement according to the invention, and FIG. 8: a depiction of the introduction of the choke arrangement according to the invention into a frame.

FIG. 1 shows an exemplary circuit configuration of a passive EMC filter with a choke 1' according to prior art, wherein the EMC filter is connected to an inverter 2. The EMC filter circuit, implemented as a passive filter, comprises an input 3 to which a voltage, for example of 48 V, can be applied and comprises the first winding $L_1$ 4 and the second winding $L_2$ 5 in feed lines HV+ and HV−, which windings are disposed on a common core, such as for example a toroidal core 10.

While a first capacitor 6 with the designation $C_1$ is located between lines HV+ and HV− directly at the input of the passive EMC filter circuit and ahead of windings $L_1$ 4 and $L_2$ 5, a second capacitor 7 with the designation $C_2$ is located behind windings $L_1$ 4 and $L_2$ 5 at the output of the EMC filter circuit and consequently at the input of the inverter 2.

A third capacitor 8 with the designation $C_3$ is provided between line HV− and ground potential. A fourth capacitor 9 with the designation $C_4$ is located between line HV+ and ground potential.

As is conventional in prior art, the inverter 2 generates the electrical control signals required for operating an electric motor, not shown, which drives, for example, a refrigerant compressor.

In FIG. 2 is shown a choke 1' in particular a common mode choke of prior art, which is realized of a toroidal ring core 10 with two windings 4 and 5 applied in opposite winding directions. To receive the wire ends of the first winding 4 as well as of the second winding 5, a mounting plate 11 is provided. The wire ends are, for example, soldered or welded to corresponding contact points or conductor tracks on the mounting plate 11 to be electrically conducting.

In addition, it is customary to secure the toroidal core 10 in position on the mounting plate 11 by means of an adhesive 12. The unit, comprised of the toroidal core 10, the first winding 4, the second winding 5 and the mounting plate 11, can be connected by means of connector pins 13 on the mounting plate 11 with a control board, not shown in FIG. 2, of an inverter. To establish an electrically conductive connection of the connector pins 13 with contact points or conductor tracks of the control board of an inverter, soldering methods or welding methods can be employed for example.

To electrically insulate the first winding 4 from the second winding 5, an insulation plate 14 is disposed in the inner diameter of the toroidal core 10. The insulation plate 14 is, for example, mechanically secured in place by means, for example, of an adhesive 12 in the inner diameter of the toroidal core 10.

FIG. 3 shows a choke arrangement 1 according to the invention with a two-part enclosure 15 receiving or encompassing a toroidal core 10. The two-part enclosure 15 is formed by means of a first half shell 16 and a second half shell 17. Both half shells 16, 17 include a coupling joint 18 which is formed such that the joining of the first half shell 16 and of the second half shell 17 is possible without a residual interspace remaining between the half shells 16, 17.

After the toroidal core 10 has been placed into the two-part enclosure 15, the half shells 16, 17 can be adhered together, for example by means of an adhesive 12. The first winding 4 and the second winding 5 are subsequently applied utilizing a winding method known in prior art and the choke arrangement 1 is completed. To improve the view of the half shells 16, 17, windings 4 and 5 are not depicted in FIG. 3.

The half shells 16, 17 are each developed comprising a portion of an insulating web 19. After the half shells have been assembled, the insulation web 19 is complete and extends through the inner diameter of the half shells 16, 17 as well as also in a region across the outer diameter of the half shells 16, 17.

The insulation web 19 which, compared to prior art, is larger, leads, on the one hand, to an improvement of the insulation between the first winding 4 and the second winding 5 and, on the other hand, to an improvement of the mechanical strength and stability of the two-part enclosure and consequently of the choke arrangement 1. The formulation of a larger insulation web 19 means that the insulation web 19 is also implemented beyond the outer diameter of the two-part enclosure 15 as well as also that the web is realized around the cross section of the two-part enclosure 15 and thus also around that of the toroidal core 10. The improvement of the mechanical strength and stability affects the two-part enclosure 15 as well as also the improved protection of the brittle material of the toroidal core 10, especially during the process of winding onto the toroidal core 10, for example in two windings 4, 5.

The half shells 16, 17 are advantageously realized and produced in identical form such that the half shells 16, 17 can be produced, for example, in a single injection mold. In addition, in this way high accuracy of fit of the half shells 16, 17 with one another is given.

The choke arrangement 1 according to the invention comprises additionally a first winding 4 and a second winding 5 that are not depicted in FIG. 3. The first winding 4, for example in the region shown in FIG. 3, can be disposed to the left of the insulation web 19 according to the invention and the second winding 5 can be disposed to the right of the insulation web 19 according to the invention. Limitation of the invention to this form of disposition of several windings 4, 5 or a limitation to only two windings 4, 5 is not intended.

FIG. 4 shows the first half shell 16 of the two-part enclosure 15 according to the invention in a view onto the inner side of the first half shell 16. Alternatively, the depiction could also show the second half shell 17 since the two half shells 16, 17 are implemented in identical form.

The half shells 16, 17 are realized such that a toroidal core 10 is emplaceable into the half shells 16, 17. The interior region of the half shells 16, 17 is adapted to the cross sectional form of the toroidal core 10. In the example of FIG. 4 the toroidal ring core 10 has a rather rectangular, in particular square, cross section. In an alternative embodiment the toroidal ring core 10 could have a rather circular cross section. In this case it is intended to implement at least the interior region of the half shells 16, 17 semicircularly.

The interior is adapted in every case to the contours of the toroidal core 10 such that an inclusion of the toroidal core 10 in the two-part enclosure 15 under form closure is attained. Therewith the toroidal core 10 is well secured in position in the two-part enclosure 15 and protected against mechanical effects. The protection involves mechanical stresses which occur during the winding in the production of the choke arrangement 1 as well as also mechanical stresses such as vibrations which occur, for example, in a completed assembly of an inverter for a refrigerant compressor that includes the choke arrangement 1.

The half shells 16, 17 have each a coupling joint 18. A coupling joint 18 represents the region or the surface with which the half shells 16, 17 are in contact after they have been assembled. In a first variant is provided to implement the coupling joints 18 planarly such that the first coupling joint 18 of the first half shell 16 is in contact flat on the second coupling joint 18 of the second half shell 17. The half shells 16, 17 can be adhered with one another for example in the region of the coupling joint 18.

According to an alternative embodiment, the coupling joints 18 of half shells 16, 17 are implemented with a stepping 20 or are stepped. In FIG. 4 by example two steppings 20 are encircled. The steppings 20 are developed in such manner that the half shells 16, 17 mutually complement each other without any gap or hollow space in the connection regions of the coupling joints 18 exhibited by the two-part enclosure 15. The half shells 16, 17 are moreover by means of such stepping 20 fixed precisely in position and secured against twisting.

FIG. 5 shows two structurally identically implemented half shells 16, 17 that are joined to form a two-part enclosure 15. The toroidal core 10 disposed in the two-part enclosure 15 is not visible in FIG. 5. The half shells 16, 17 are provided with a stepped coupling joint 18, wherein a stepping 20 is depicted which is formed in the region of the insulation web 19 according to the invention. The arrow illustrates the emplacement of the first half shell 16 onto the second half shell 17 to provide the two-part enclosure 15. For the completion of the choke arrangement 1 according to the invention, on the two sides of the insulation web 19 one winding 4 or 5 is disposed, which is not shown in FIG. 5.

FIG. 6 shows a schematic diagram of the positioning of a choke arrangement 1 with a control board 21 of an inverter for actuating an electric refrigerant compressor.

The first half shell 16 of a two-part enclosure 15 enveloping a toroidal core 10 is shown facing the viewer. On the two-part enclosure 15 the first winding 4 and the second winding 5 is applied. The ends of windings 4 and 5 are connected to a mounting plate 11 wherein the mounting plate 11 comprises connector pins 13. The connector pins 13 are coupled electrically conductively with contact areas or conductor tracks on the control board 21 of an inverter. The two-part enclosure 15 is connected with the mounting plate 11 by means of an adhesive agent 12. The choke arrangement 1 is, in addition, disposed in a receptacle 22 enveloping the choke arrangement 1. The receptacle 22 comprises at least one U-shaped retainer 23 for receiving and securing the insulation web 19 in position. For additional securement, the insulation web 19 is adhered to the U-shaped retainer 23 by means of an adhesive agent 12. The robust disposition of the choke arrangement 1 on the control board 21 of an inverter is ensured.

In FIG. 7 is depicted a receptacle 22 suitable for positioning the two-part enclosure 15. The receptacle 22 comprises a U-shaped retainer 23 on each of three internal sides. The two-part enclosure 15 can be slid into the U-shaped retainer 23 by means of the insulation web 19 extending over the outer diameter. This enables the securement in position of the two-part enclosure 15 in the receptacle 22. Adhering the insulation web 19 in the U-shaped retainer 23 can also be provided.

In this manner the U-shaped retainer 23 enables the strong and stable securement of the two-part enclosure 15 in position. The insulation of the two windings 4, 5 with respect to each other is, moreover, further improved since no air gap can any longer develop between the windings 4, 5. The receptacle 22 can be connected with control board 21 of an inverter, not shown in FIG. 7, by threaded or adhered connection.

In FIG. 8 the process of emplacing the choke arrangement 1 according to the invention is shown, wherein the choke arrangement 1 is shown simplified without windings 4, 5. In the following the receptacle 22 is disposed, for example, on the underside of a control board 21 of an inverter. The arrow illustrates the sliding-in of the two-part enclosure 15 into the receptacle 22. By sliding the choke arrangement 1 with the insulation web 19 into the U-shaped retainer 23 of the receptacle 22 a highly exact positioning of the choke arrangement 1 is attained without additionally necessary means or without additional assembly work. In addition, through the cooperation of the insulation web 19 with the U-shaped retainer 23 the insulation between the first winding 4 and the second winding 5 is greatly improved. The technique of sliding the choke arrangement 1 into the U-shaped retainer 23 not only reduces the required assembly time for securing the choke arrangement 1 in position but also enables the automatic assembly or fabrication of the components or subcomponents which are in connection with the choke arrangement 1.

One advantage of the present invention entails that the insulation of the windings 4, 5 with respect to one another has been improved on the choke arrangement 1 according to the invention in comparison to prior art. Furthermore, a more robust envelopment for the toroidal core 10 was provided, in particular for the application of the winding of the toroidal core 10 with the wire turns of the windings 4, 5.

A further advantage resides in the simplification of the expenditures and effort for the production of the half shells 16, 17 of the two-part enclosure 15 through their structurally identical implementation. Both half shells 16, 17 can therefore be produced, for example, by means of a single injection mold.

Due to the special formation of the two-part enclosure 15 and the integration of the insulation web 19 into the half shells 16, 17, the strength and stability and the resistance to vibrations of the choke arrangement 1 are improved.

Furthermore, through a reception of the choke arrangement 1 with the two-part enclosure 15 in a special frame an improved encapsulation and a further improvement of the insulation properties can be achieved.

LIST OF REFERENCE NUMBERS

1 Choke arrangement
1' Prior art choke
2 Inverter
3 Input (HV+/HV−)
4 First winding $L_1$
5 Second winding $L_2$
6 First capacitor $C_1$
7 Second capacitor $C_2$
8 Third capacitor $C_3$
9 Fourth capacitor $C_4$
10 Toroidal core
11 Mounting plate
12 Adhesive agent
13 Connector pin
14 Insulation plate (prior art)
15 Two-part enclosure
16 First half shell
17 Second half shell
18 Coupling joint
19 Insulation web
20 Stepping
21 Control board of inverter
22 Receptacle
23 U-shaped retainer

The invention claimed is:

1. A choke arrangement for application in an electromagnetic compatibility filter, comprising a toroidal core and at least two windings which are disposed on the toroidal core under electrical isolation, wherein a two-part enclosure is disposed about the toroidal core,
   wherein the two-part enclosure is formed of two structurally identically formed half shells which are disposed such that they are oriented with their coupling joints toward one another,
   wherein an insulation web is disposed in the two-part enclosure such that the insulation web extends through the inner diameter of each of the half shells as well as also in a region across the outer diameter of each of the half shells,
   wherein the coupling joints of the half shells are stepped, and
   wherein a stepping is formed in the region of the insulation web, so that the half shells are accurately fixed and are prevented from twisting by the stepping.

2. A choke arrangement according to claim 1, wherein a mounting plate is disposed securing in position the wire ends of the windings of the choke arrangement.

3. A choke arrangement according to claim 1, wherein connector pins are disposed on the mounting plate.

4. A choke arrangement according to claim 1, wherein the windings are disposed on the two-part enclosure.

5. A receptacle for a choke arrangement according to claim 1, wherein the choke arrangement is disposed in a receptacle encompassing the choke arrangement and securing the same in position.

6. A receptacle according to claim 5, wherein the receptacle comprises a U-shaped retainer in which is disposed the portion of the insulation web projecting beyond the outer diameter of each of the half shells.

7. A receptacle according to claim 6, wherein the U-shaped retainer is disposed extending over the three internal sides of the receptacle.

8. A receptacle according to claim 6, wherein the choke arrangement is a choke arrangement disposable into the U-shaped retainer of the receptacle by being slid into it using the insulation web.

* * * * *